United States Patent
Palacio Argüelles et al.

(10) Patent No.: US 8,656,805 B2
(45) Date of Patent: Feb. 25, 2014

(54) PEDAL COVERING FOR A MOTOR VEHICLE

(75) Inventors: Joseba Palacio Argüelles, Santurtzi (ES); Fernando Burguera Albizuri, Bilbao (ES); Asier Guijarro Plaza, Bilbao (ES)

(73) Assignee: Batz, S. Coop., Igorre (ES)

( * ) Notice: Subject to any disclaimer, the term of this patent is extended or adjusted under 35 U.S.C. 154(b) by 904 days.

(21) Appl. No.: 12/518,874

(22) PCT Filed: Jun. 18, 2008

(86) PCT No.: PCT/ES2008/070118
§ 371 (c)(1),
(2), (4) Date: Jun. 11, 2009

(87) PCT Pub. No.: WO2009/153363
PCT Pub. Date: Dec. 23, 2009

(65) Prior Publication Data
US 2010/0300243 A1    Dec. 2, 2010

(51) Int. Cl.
*G05G 1/48*    (2008.04)
*G05G 1/483*    (2008.04)

(52) U.S. Cl.
USPC .............................................. 74/563; 74/560

(58) Field of Classification Search
USPC ......... 74/560–564, 594.4, 512–514; 280/291; 180/90.6; 296/75; D12/125
See application file for complete search history.

(56) References Cited

U.S. PATENT DOCUMENTS 1,297,202 A * 3/1919 McGiehan ...................... 74/563
1,784,782 A   12/1930 Bronson
1,977,415 A * 10/1934 Thorp .............................. 74/563
3,811,339 A *  5/1974 Konzorr ....................... 74/594.4
5,609,069 A *  3/1997 Swenson ......................... 74/563
5,673,597 A * 10/1997 Lin ................................. 74/563

(Continued)

FOREIGN PATENT DOCUMENTS

DE   202007000570 U1    3/2007
FR      2897171 A1 *    8/2007

(Continued)

OTHER PUBLICATIONS

[JP, 2006-236179,A]. Japan Patent Office. http://dossier1.ipdl.inpit.go.jp/AIPN/odse_call_transl.ipdl?N0000=7413&N0005=Ei7BzenZVnBvfz7D1ZIK&N0120=01&N2001=2&N3001=2006-236179&Ntt3=machineV14&Ntt4=autoV14&Ntt5=logisticsV14&Ntt6=&Ntt7=&Ntt8=&Ntt9=&Ntt10=&Ntt11=&Ntt12=.*

*Primary Examiner* — Daniel Yabut
(74) *Attorney, Agent, or Firm* — Tim L. Kitchen; Peter B. Scull; Hamilton, DeSanctis & Cha, LLP

(57) ABSTRACT

A pedal covering having an elastic covering cap. The pedal covering includes a plurality of protuberances, a plate including a base that is disposed on the elastic covering cap and which includes a plurality of holes in which the protuberances are inserted. The plate has at least one main projection including a first segment that extends continuously from the base and a second segment continuous to the first segment, the maximum width of the second segment being greater than the maximum width of the first segment. In addition, the elastic covering cap includes, for each main projection, a housing with a groove, the width of the groove being smaller than the maximum width of the second segment, and the groove being passed through by the main projection, with the result that the second segment comes up against the elastic covering cap once it has passed through the groove.

8 Claims, 4 Drawing Sheets

(56) References Cited

U.S. PATENT DOCUMENTS

| | | | |
|---|---|---|---|
| 5,884,534 A * | 3/1999 | Knoll et al. | 74/562 |
| 6,622,592 B2 | 9/2003 | Lee | |
| 2004/0144199 A1 | 7/2004 | Kanbe et al. | |

FOREIGN PATENT DOCUMENTS

| | | |
|---|---|---|
| GB | 2309508 A | 7/1997 |
| JP | 2001084048 A | 3/2001 |
| JP | 2006236179 A | 9/2006 |

* cited by examiner

PEDAL COVERING FOR A MOTOR VEHICLE

CROSS-REFERENCE TO RELATED APPLICATIONS

This application is a national phase of International Application No. PCT/ES2008/070118, filed Jun. 18, 2008.

TECHNICAL FIELD

The present invention relates to a covering adapted to a foot-pedal of a motor vehicle.

BACKGROUND

There are known pedal coverings that include an elastic covering cap, adaptable to the shape of the foot-pedal to which it is fitted, with a plurality of non-slip means which extend from the surface of the elastic covering cap, and a plate with a plurality of grooves in which the plurality of non-slip means are inserted.

In addition different means for fixing the plate to the elastic covering cap and/or the foot-pedal are also known. U.S. Pat. No. 6,622,592 B2 describes a pedal covering that comprises fixing means that include a curved part in the plate that extends along the perimeter of the plate, a locking projection and a pair of coupling clips that retain the elastic covering cap and fix it to the foot-pedal.

GB2309508B describes an elastic covering cap designed to be fixed to the foot-pedal, wherein the non-slip means have a first part that extends from the base, and a second part that extends laterally from the end of the first part to define a surface facing the base, with the result that the plate is held securely between the facing surface and the base.

SUMMARY OF THE DISCLOSURE

It is an object of the present invention to provide a pedal covering adapted to a foot-pedal of a motor vehicle.

A pedal covering according to one embodiment comprises an elastic covering cap designed to be fixed to a shoe of a foot-pedal and which comprises a plurality of protuberances, and a plate that includes a base that is disposed on the elastic covering cap and which comprises a plurality of holes in which the protuberances are inserted.

The plate is fixed to the elastic covering cap in a simple and secure manner. To achieve this, the plate comprises at least one projection that includes a first segment that extends continuously from the base and a second segment continuous to the first segment, the maximum width of the second segment being greater than the maximum width of the first segment. In addition, the elastic covering cap comprises, for each plate's projection, a housing with a groove of a width smaller than the maximum width of the second segment, the groove being passed through by the projection, with the result that the second segment comes up against the elastic covering cap once it has passed through the mouth.

DETAILED DESCRIPTION

Figure 1:
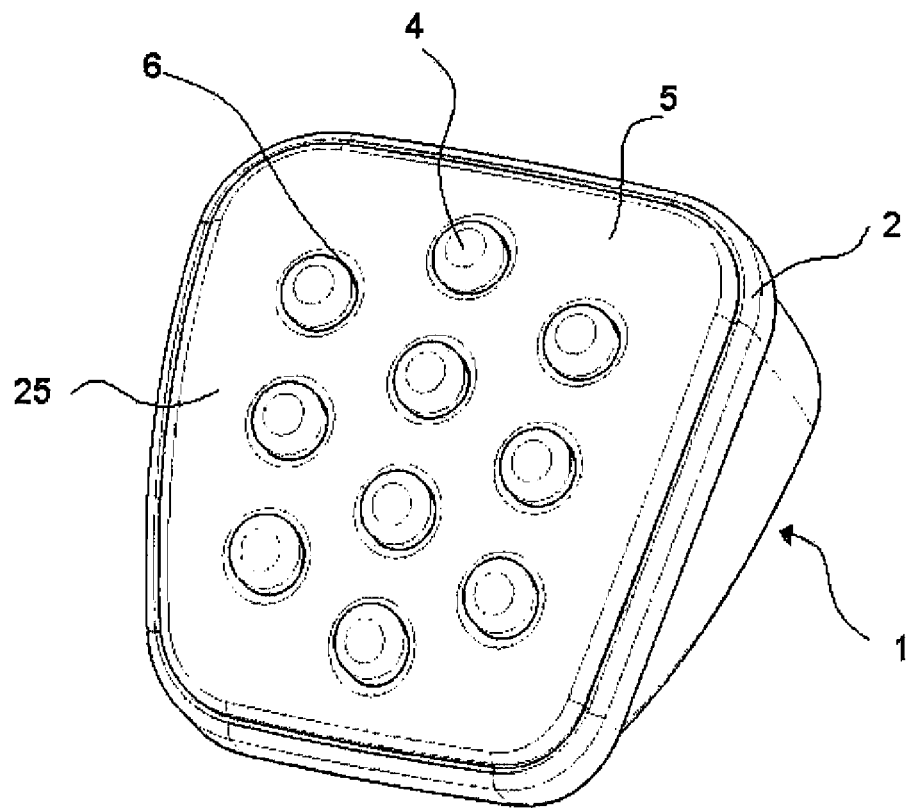
FIG. 1 is a perspective view of a pedal covering according to one embodiment.

FIGS. 1 to 6 show an embodiment of a pedal covering 1 according to an embodiment of the present invention. In the embodiment of FIG. 1, the pedal covering 1 comprises an elastic covering cap 2 designed to be fixed directly to a pedal shoe 3 of a motor vehicle and a plurality of substantially cylindrical non-slip protuberances 4, and a plate 5 that comprises a substantially warped base 25 or base that is otherwise adaptable to the shape of the elastic covering cap 2, and a plurality of holes 6 through which the corresponding protuberances 4 pass.

Figure 3:
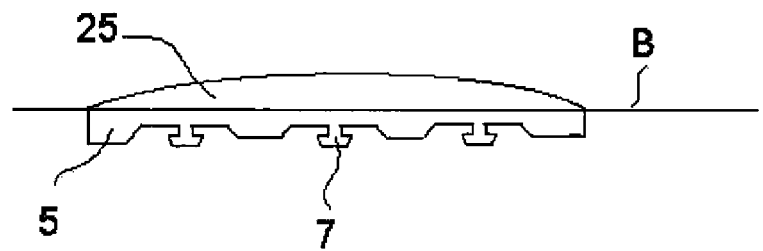
FIG. 3 is a schematic frontal view of a plate of the pedal covering shown in FIG. 1.

The plate 5 may be metallic, plastic or a combination of various materials, and includes a plurality of projections 7, 20 that extend substantially orthogonal to a plane of projection B, shown in FIG. 3, upon which the base 25 projects.

Figure 2:
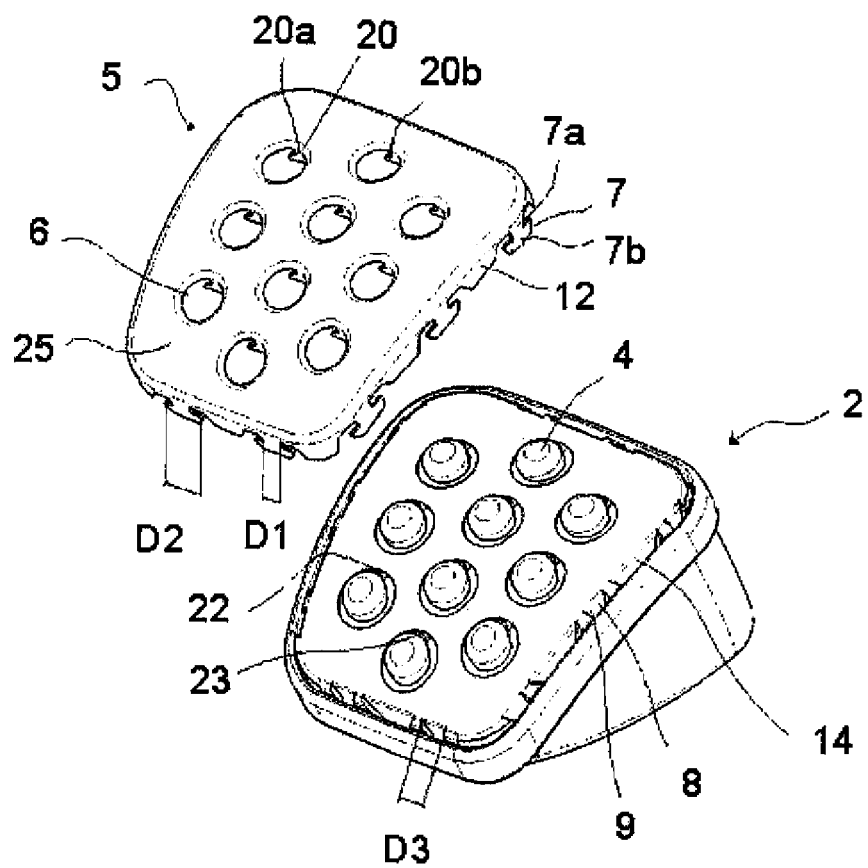
FIG. 2 is an exploded view of the pedal covering shown in FIG. 1.
Figure 4:
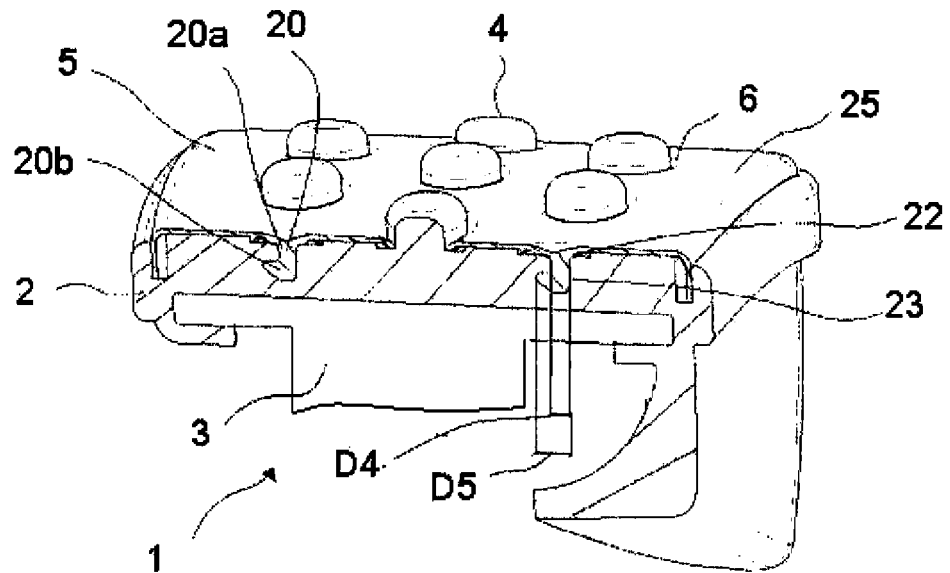
FIG. 4 is a first cross-sectional view of the pedal covering shown in FIG. 1.
Figure 5:
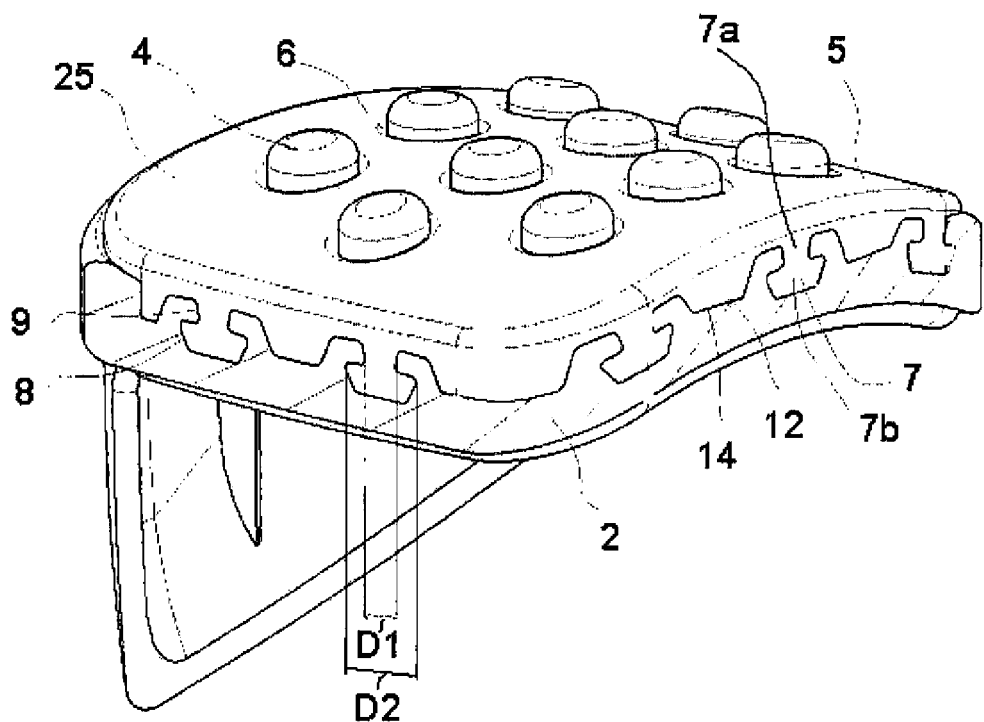
FIG. 5 is a second cross-sectional view of the pedal covering shown in FIG. 1.

In a preferred embodiment, as shown in FIGS. 2, 4 and 5, the plate 5 includes a plurality of projections 7 disposed along the perimeter of the plate 5 and a plurality of projections 20, each one of which extends from the edge of the respective holes 6 of the plate 5.

The projections 7, which are disposed along the perimeter of plate 5, comprise a first segment 7a that extends continuously from the base 25 and a second segment 7b continuous to the first segment 7a, the maximum width of the second segment D2 being greater than the maximum width of the first segment D1.

Figure 6:
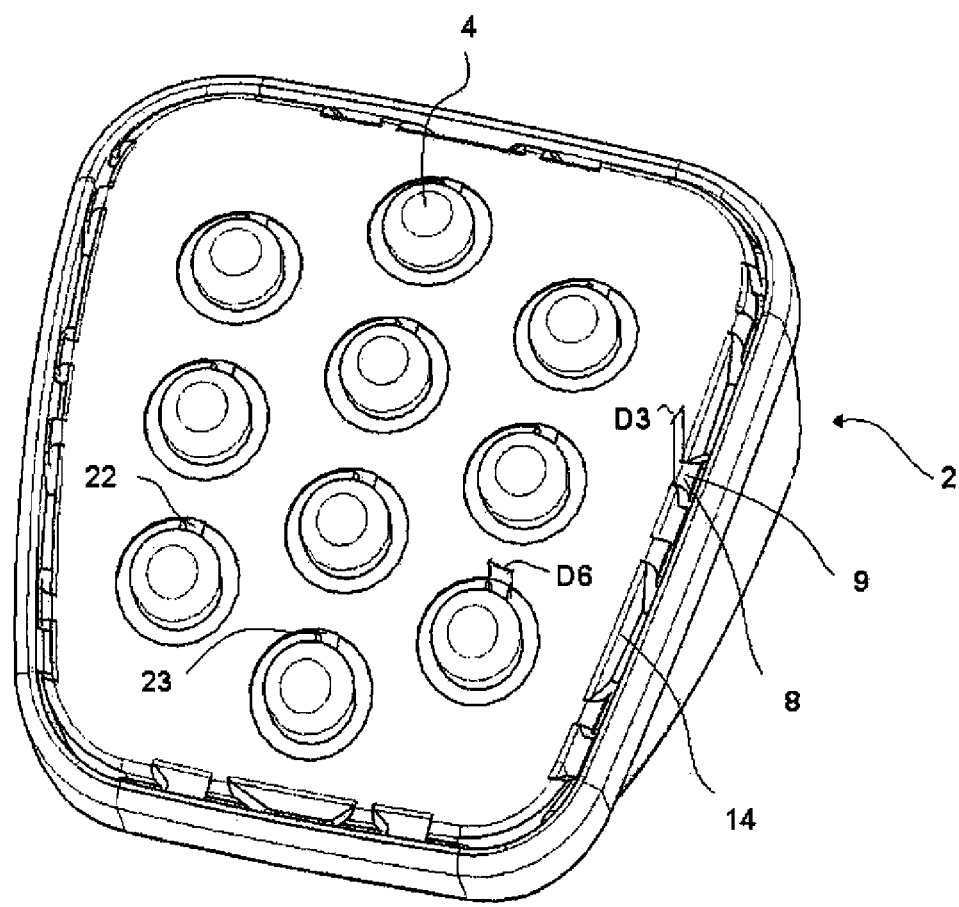
FIG. 6 is a view of a pedal casing of the pedal covering shown in FIG. 1.

In addition, the elastic covering cap 2, shown in detail in FIG. 6, includes, along the outer perimeter, a plurality of housings 8, preferably disposed equidistant to each other, each one of which comprises a groove 9 of a maximum width D3 smaller than the width of the second segment D2 of the projection 7. Each housing 8 is preferably a blind opening adapted to the shape of the second segment 7b of projections 7.

Furthermore, the projections 20 that extend from an edge of the respective holes 6, comprise a first segment 20a that extends continuously from the base 25 and a second segment 20b continuous to the first segment 20a, the maximum width of the second segment D5 being greater than the maximum width of the first segment D4.

Similarly, the elastic covering cap 2 includes, along the perimeter of each protuberance 4, a housing 22 that comprises a groove 23 of a maximum width D6 smaller than the width of the second segment D5 of projections 20. Preferably, each housing 20 is a blind opening adapted to the shape of the second segment 20b of projection 20.

When the plate 5 is fitted on the elastic covering cap 2, each projection 7, 20 easily passes through the groove 9, 23 of the respective housing 8, 22 as the grooves 9, 23 are elastic, each second segment 7b, 20b being housed in the respective housing 8, 22. The plate 5 is thus fixed to the elastic covering cap 2, given that each second segment 7b, 20b comes up against the inner surface of the respective housing 8, 22, as the maximum width of the grooves D3, D6 is smaller than the maximum width of the second segment D2, D5.

As a result, plate 5 is fixed to the elastic covering cap 2 through the projections 7, 20 that are inserted in the elastic covering cap 2 and not through the protuberances 4 of the elastic covering cap 2, which in this case only pass through the plate 5.

In addition, plate 5 may include a plurality of substantially rectangular auxiliary projections 12, that extend substantially orthogonal to the plane of projection B and which are disposed along the perimeter of the base 25. In one embodiment, the auxiliary projections 12 are preferably disposed between the plurality of projections 7 and are housed in a plurality of cavities 14, adapted respectively to the outer shape of the auxiliary projections, which are disposed along the perimeter of the elastic covering cap 2 disposed between the plurality of housings 8, the auxiliary projections 12 fixing the plate 5 more firmly to the elastic covering cap 2, and providing the unit formed by the elastic covering cap 2 and the plate 5 with greater strength.

In other embodiments of the invention not shown in FIGS. 1 to 6, plate 5 may only include projections 7 disposed on the perimeter, the projections being capable of not being disposed equidistant to each other; or may include only projections 20, each one of which extends from the edge of the corresponding hole 6; or may also include more than one projection 20 on each edge of the hole 6; or may be disposed on other points of the plate.

The projections 7, 20 may also have shapes different to those shown in FIGS. 2, 4 and 5, and may thus, for example, have a flat conical shape, a rounded shape or a heart shape, or, alternatively, instead of having a flat shape, they may have a shape of revolution, in which case the references to the respective width sizes may be understood as diameters. Finally, the housings 8, 22 may be non-blind openings.

What is claimed is:

1. A pedal covering designed to be fixed to a shoe of a foot-pedal of a motor vehicle, comprising
    an elastic covering cap fixed to the shoe and comprising a plurality of protuberances extending upward from a surface of the elastic covering cap,
    a plate comprising a base that is disposed on the elastic covering cap and which comprises a plurality of holes in which are inserted the protuberances,
    the plate comprising at least one first projection that each include a first segment that extends continuously from the base and a second segment continuous to the first segment, a maximum width of the second segment being greater than a maximum width of the first segment, and
    the elastic covering cap comprising for each first projection a first expandable groove that extends downward from the surface of the elastic covering cap into a blind opening, the blind opening having a shape adapted to the outer shape of the second segment, the width of the first expandable groove being smaller than the maximum width of the second segment, when the plate is assembled on the elastic covering cap the first expandable groove is passed through by the first projection in a manner that the first segment of the first projection resides within the first expandable groove and the second segment of the first projection resides within the blind opening where the second segment of the first projection comes against an inner surface of the blind opening to secure the plate to the elastic covering cap,
    wherein the second segment of the first projection is disposed deeper into the elastic covering cap from the base than the first segment of the first projection,
    wherein the plate comprises at least one second projection that extends from the edge of at least one of the plurality of holes of the plate, the second projection having a first segment that extends continuously from the edge of the hole and a second segment continuous to the first segment, a maximum width of the second segment of the second projection being greater than a maximum width of the first segment of the second projection, and
    the elastic covering cap having for each second projection a second expandable groove that extends downward from the surface of the elastic covering cap into a housing, the housing having a shape adapted to the outer shape of the second segment of the second projection, the width of the second expandable groove being smaller than the maximum width of the second segment of the second projection,
    when the plate is assembled on the elastic covering cap the second expandable groove is passed through by the second projection in a manner that the first segment of the second projection resides within the second expandable groove and the second segment of the second projection resides within the housing where the second segment of the second projection comes against an inner surface of the housing to secure the plate to the elastic covering cap,
    wherein the second segment of the second projection is disposed deeper into the elastic covering cap from the base than the first segment of the second projection.

2. A pedal covering according to claim 1, wherein the first projection extends substantially orthogonal to a plane of projection of the base of the plate.

3. A pedal covering according to claim 1, wherein the at least one first projection defines a plurality of first projections that extend along the outer perimeter of the plate.

4. A pedal covering according to claim 3, wherein the first projections are disposed equidistant to each other.

5. A pedal covering according to claim 3, wherein the plate incorporates at least one auxiliary projection that extends substantially orthogonal to a plane of the base of the plate and the elastic covering cap comprises, for each auxiliary projection, a blind cavity in which the auxiliary projection is housed, the at least one auxiliary projection having a shape that is different from the shape of the first projection, the auxiliary projection residing between two of the plurality of first projections along the outer perimeter of the plate.

6. A pedal covering according to claim 3, wherein the plate comprises a plurality of auxiliary projections that extend along the outer perimeter of the plate, each of the plurality of auxiliary projections having a shape that is different from the shape of the first projections, the auxiliary projections being disposed between the plurality of first projections, and the elastic covering cap having a plurality of blind cavities that are disposed between the plurality of housings for receiving at least a portion of the auxiliary projections.

7. A pedal covering according to claim 1, wherein the housing is a blind opening.

8. A pedal covering according to claim 1, wherein the second projection extends substantially orthogonal to a plane of projection of the base of the plate.

* * * * *